UNITED STATES PATENT OFFICE.

WALIS A. PUTNAM, OF PALATINE, ILLINOIS.

WASHING FLUID.

SPECIFICATION forming part of Letters Patent No. 363,764, dated May 24, 1887.

Application filed November 23, 1886. Serial No. 219,682. (No specimens.)

*To all whom it may concern:*

Be it known that I, WALIS A. PUTNAM, a citizen of the United States, residing at Palatine, in the county of Cook and State of Illinois, have invented a new and useful Improvement in Washing Fluids, of which the following is a specification.

The object of my invention is to make an efficient fluid or liquid to be used in the washing of clothes; and the invention consists in the washing fluid hereinafter described and claimed.

My improved washing fluid is preferably made from a mixture of kerosene or other hydrocarbon oil, alcohol, borax, and ammonia; and these ingredients are preferably used in about the following proportions: two parts of hydrocarbon oil, one part of alcohol, one part of borax, preferably powdered, and two parts of ammonia.

In preparing my improved washing liquid I mix and stir the ingredients in a suitable vessel about as follows: I put in the oil and alcohol, and then heat or warm the vessel until its contents begin to bubble. At this stage I put in the powdered borax, and then stir the mixture well, after which the ammonia is put in, thus completing the work. When so desired, the alcohol can be omitted; and in some cases equivalents may be used for the other ingredients. With the washing fluid thus formed, clothes can be readily and thoroughly washed by simply boiling them in a suitable vessel containing about one table-spoonful of the liquid to a pail of water, so that after such boiling they only need to be rinsed before hanging out to dry. It will thus be seen that a very important advantage of my invention is that it dispenses with the use of a washing-machine or rubbing the clothes on an ordinary wash-board.

While I prefer the ingredients and proportions and the way of mixing them together above described, I do not wish to be understood as in any way limiting myself to them, inasmuch as it is apparent that the same results can be accomplished by using somewhat different ingredients or using the same ingredients in different proportions and putting them in or mixing them together in different order; but

What I claim, and desire to secure by Letters Patent, is—

1. A washing liquid compounded from hydrocarbon oil, borax, and ammonia, or their equivalents, substantially as described.

2. A washing liquid compounded from hydrocarbon oil, alcohol, borax, and ammonia, or their equivalents, substantially as described.

3. A washing liquid compounded from two parts hydrocarbon oil, one part alcohol, one part borax, and two parts ammonia, or their equivalents, substantially as described.

WALIS A. PUTNAM.

Witnesses:
EPHRAIM BANNING,
E. F. HUBBARD.